Jan. 5, 1965 W. VLASAK 3,164,788
TEMPERATURE COMPENSATED TRANSISTOR TRANSLATING CIRCUITS
Filed Feb. 8, 1960
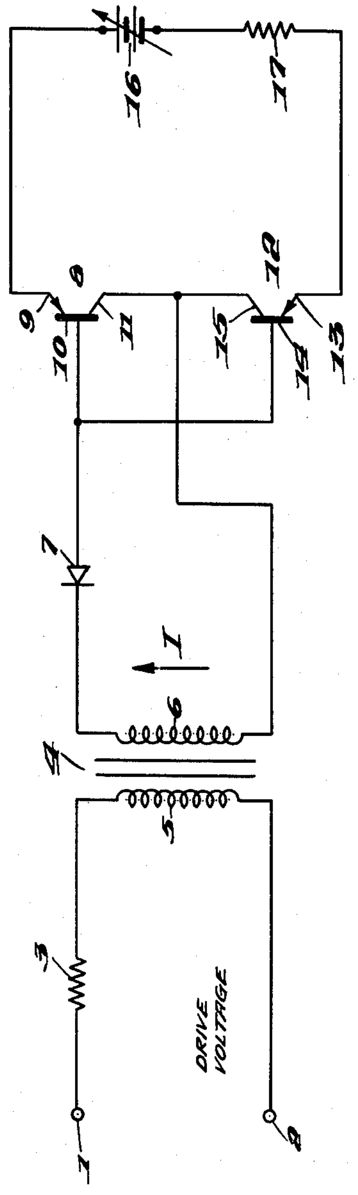
INVENTOR
WELDON VLASAK,
BY Stevens, Davis, Miller & Mosher
ATTORNEYS

United States Patent Office 3,164,788
Patented Jan. 5, 1965

3,164,788
TEMPERATURE COMPENSATED TRANSISTOR TRANSLATING CIRCUITS

Weldon Vlasak, La Puente, Calif., assignor to Airpax Electronics Incorporated, Fort Lauderdale, Fla., a corporation of Maryland Filed Feb. 8, 1960, Ser. No. 7,142
2 Claims. (Cl. 332—9)

This invention relates to improved electric circuits, and more particularly to improved transistor modulator and demodulator circuits.

One type of modulator circuit, to which the principles of the invention apply, is known as a transistor chopper circuit. One of the prime disadvantages or drawbacks of prior transistor chopper circuits is the large null or noise voltage. Null or noise voltage means that a voltage exists at the output of the chopper circuit with no input voltage. Temperature-sensitive leakage current in a transistor chopper circuit is one of the main sources of the null or noise voltage. The term, leakage current, is used to mean the total reverse leakage current in the circuit, which includes the $I_{CO}$ or collector diode reverse current. Variations in temperature over an operating temperature range result in changes in the null or noise voltage. With an increase in temperature, the leakage current may increase sufficiently to cause a large null or noise voltage. The null or noise voltage must be made independent of variations in the temperature-sensitive leakage current so that it will remain constant over the operating temperature range. Large null or noise voltage limits the use of the transistor chopper circuit.

Despite the limitations and drawbacks of prior transistor chopper circuits, no alternative method has been suggested for making the null or noise voltage independent of temperature variations.

It is, therefore, the principal aim of this invention to provide a way to overcome the difficulties and limitations of prior transistor chopper circcuits. This is accomplished by the present invention by placing a diode in the base-collector circuit of the transistors to limit the leakage current of the transistor chopper circuit to the back current of the diode. The diode in the base-collector circuit of the transistors prevents the temperature-sensitive leakage current from increasing with increases in temperature. With no increase in the temperature-sensitive leakage current, there is no change in the null or noise voltage of the transistor chopper circuit. Accordingly, the expedient of this invention has the result of making the null or noise voltage independent of temperature variations. With suitable constancy achieved, the invention provides an improved transistor chopper circuit for applications requiring a low null or noise voltage over an operating temperature range.

The main object of this invention is to provide a simple and easy method of making the null or noise voltage of an electric circuit for modulating and demodulating independent of temperature variations.

Another object of this invention is to provide an improved transistor chopper circuit which features means adapted to prevent changes in the temperature-sensitive leakage current with variations in temperature.

Other objects and advantages of the invention will become apparent from the following detailed description of a preferred embodiment of the invention when taken with the drawing which shows in the sole figure a schematic of the preferred embodiment of the invention.

Referring now to the sole figure, there is shown a transistor chopper circuit. This is a transistor chopper connected in a modulation circuit. The circuit is a switching type modulator. The transistor chopper circuit, shown in the sole figure, comprises a pair of PNP transistors 8 and 12. Transistor 8 consists of an emitter 9, a base 10 and a collector 11, while transistor 12 consists of an emitter 13, a base 14 and a collector 15. The bases 10 and 14 of the transistors 8 and 12 are connected together. The collectors 11 and 15 are also connected together.

A signal, shown as a battery 16, is connected across the emitters 9 and 13 through load impedance 17. It is appreciated that the emitters and collectors of the transistors may be reversed, which is desired in some instances. It is appreciated that the signal is not restriced to the battery 16, but may be a varying signal having a low frequency or other suitable signals. The load impedance is also not restricted to the resistor 17, but may be any suitable load impedance, such as an inductor.

A drive voltage, such as an A.C. input, is connected across the input terminals 1 and 2. It is appreciated that the drive voltage is not restricted to an A.C. input, but may be a square wave or other suitable drive voltages. Resistor 3 is a current-limiting resistor. Resistor 3 may be zero in some instances. The drive voltage is connected to the base-collector circuits of the transistors 8 and 12 through an input drive transformer 4. The input drive transformer 4 consists of a primary winding 5 and a secondary winding 6.

In order to make the null or noise voltage independent of variations in the temperature-sensitive leakage current, a diode 7 is placed in the base-collector circuit of the transistors 8 and 12 to limit the leakage current to the back current of the diode. The anode of the diode 7 is connected to the bases 10 and 14 of the transistors 8 and 12, while the cathode of the diode 7 is connected to one side of the secondary winding 6 of the transformer 4. The leakage current of the transistor chopper circuit is represented by the current I. This leakage represents the total leakage current, which includes the $I_{CO}$ or collector diode reverse current.

Without the diode 7 in the base-collector circuits of the transistors 8 and 12, the temperature sensitive leakage current I varies with changes in temperature. As the temperature increases, there is an increase in the leakage current I, causing an increase in the null or noise voltage across the load impedance 17.

The use of the diode 7 in the base-collector circuits of the transistors 8 and 12 prevents changes in the leakage current I with changes in temperature. The diode 7 limits the leakage current I to the back current of the diode. With no increase in leakage current I with the increase in temperature, the null or noise voltage across the load impedance 17 remains constant.

The diode 7 in the transistor chopper circuit is a semiconductor diode, such as a germanium diode. The germanium diode 7 limits the leakage current I to the back current of the diode. However, in order to decrease the back current further, a diode having a high back resistance must be utilized. The use of a silicon diode, which has a higher back resistance than a germanium diode, causes the back current to be lowered. The silicon diode will limit the leakage current I to the lower back current, causing the null or noise voltage across the load impedance 17 to be lowered. The use of a silicon diode provides a superior transistor chopper circuit having a lower null or noise voltage due to the low leakage current of silicon as compared to germanium.

The transistor chopper circuit, shown in the sole figure, is a half-wave transistor chopper circuit. The circuit utilized PNP transistors 8 and 12. With this type of transistor, the anode of the diode 7 must be connected to the bases 10 and 14 of transistors 8 and 12. If the diode 7 is placed on the other side of the secondary winding 6 of the transformer 4, the cathode of the diode 7 would then have to be connected to the collectors 11 and 15. If NPN transistors are used, the diode 7 must be reversed so that the cathode of the diode 7 is connected to the bases of the NPN transistors.

The drive transformer 4 is not necessary if common grounds do not short out part of circuit.

The principles of this invention also apply to full-wave transistor chopper circuit. To obtain a full-wave transistor chopper circuit, the half-wave chopper circuit is doubled and is provided with a common drive voltage, signal voltage and load impedance. The description of the full-wave transistor chopper circuit is similar to the half-wave transistor chopper circuit.

Although the present invention has been shown and described in the terms of a specific preferred embodiment, changes and modifications which do not depart from the inventive concepts taught herein will suggest themselves to those skilled in the art. Such changes and modifications are deemed to fall within the scope and contemplations of the invention.

What is claimed is:

1. A modulator circuit comprising a pair of matched transistors having their collector electrodes connected together and their base electrodes connected together, an input drive transformer having its primary winding connected to receive the signal to be modulated and its secondary winding connected between said base and collector electrodes, means connected between the emitter electrodes of said transistors for applying a modulating signal to said transistors, means in the emitter circuit of said transistors for obtaining a modulated output signal, and a semiconductor diode connected in series between one of the transistors and said secondary winding of said input drive transformer for limiting the reverse leakage current flow between said base and collector electrodes.

2. A demodulator circuit comprising a pair of matched transistors having their collector electrodes connected together and their base electrodes connected together, an input drive transformer having its privary winding connected to receive the input signal to be demodulated and its secondary winding connected between said base and collector electrodes, means connected between the emitter electrodes of said transistors for obtaining the demodulated output signal, and a smiconductor diode connected in series between said base electrodes and said secondary winding of said input drive transformer for limiting the reverse leakage current flow between said base and collector electrodes.

References Cited in the file of this patent

UNITED STATES PATENTS

| | | |
|---|---|---|
| 2,864,904 | Jensen | Dec. 16, 1958 |
| 2,899,571 | Myers | Aug. 11, 1959 |
| 2,986,652 | Eachus | May 30, 1961 |
| 3,003,122 | Gerhard | Oct. 3, 1961 |

OTHER REFERENCES

Cattermole: "Transistor Circuits," 1959, pages 38, 39, 211–216, Heywood and Co., Ltd., London.